(12) United States Patent
Skinner et al.

(10) Patent No.: US 10,247,840 B2
(45) Date of Patent: Apr. 2, 2019

(54) OPTICAL WELL LOGGING

(71) Applicant: HALLIBURTON ENERGY SERVICES, INC., Houston, TX (US)

(72) Inventors: Neal G. Skinner, Lewisville, TX (US); Etienne M. Samson, Cypress, TX (US); Christopher L. Stokely, Houston, TX (US); David A. Barfoot, Houston, TX (US); John L. Maida, Jr., Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 13/748,749

(22) Filed: Jan. 24, 2013

(65) Prior Publication Data
US 2014/0203946 A1 Jul. 24, 2014

(51) Int. Cl.
| | | |
|---|---|---|
| E21B 47/12 | (2012.01) | |
| G01V 8/24 | (2006.01) | |
| G01V 9/00 | (2006.01) | |
| G01V 1/22 | (2006.01) | |
| G01H 9/00 | (2006.01) | |
| G01V 1/44 | (2006.01) | |
| E21B 47/10 | (2012.01) | |

(52) U.S. Cl.
CPC ............ G01V 1/226 (2013.01); E21B 47/102 (2013.01); G01H 9/004 (2013.01); G01V 1/44 (2013.01); G01V 8/24 (2013.01)

(58) Field of Classification Search
USPC ......... 340/854.7, 870.28–870.29; 385/12–13
See application file for complete search history.

(56) References Cited

U.S. PATENT DOCUMENTS

| | | | |
|---|---|---|---|
| 4,079,390 A | 3/1978 | Iwata et al. | |
| 4,538,140 A | 8/1985 | Prestel | |
| 4,870,902 A | 10/1989 | Simon et al. | |
| 5,682,134 A | 10/1997 | Stallbohm | |
| 6,874,361 B1 * | 4/2005 | Meltz ..................... | E21B 43/14 73/152.32 |
| 2002/0109080 A1 | 8/2002 | Tubel et al. | |
| 2003/0010495 A1 | 1/2003 | Mendez et al. | |
| 2003/0020631 A1 | 1/2003 | Haase et al. | |
| 2003/0197849 A1 | 10/2003 | Ishikawa et al. | |
| 2003/0205083 A1 | 11/2003 | Tubel et al. | |
| 2004/0069069 A1 | 4/2004 | Gysling et al. | |

(Continued)

OTHER PUBLICATIONS

Mouser Electronics; "Bourns 2027-07-SM-LF", web page via http://www.mouser.com, dated Jan. 8, 2013, 2 pages.

(Continued)

*Primary Examiner* — Muhammad N Edun
*Assistant Examiner* — Jerold B Murphy
(74) *Attorney, Agent, or Firm* — Chamberlain Hrdlicka

(57) ABSTRACT

A method of logging a well can include conveying an optical waveguide and at least one signal generator with a conveyance into the well, causing the signal generator to generate at least one signal in the well, and receiving the signal as distributed along the optical waveguide. A well logging system can include a conveyance with an optical waveguide, and at least one signal generator which is conveyed by the conveyance into a well with the optical waveguide, whereby the signal generator generates at least one signal received with the optical waveguide.

27 Claims, 5 Drawing Sheets

(56) References Cited

U.S. PATENT DOCUMENTS

| | | | |
|---|---|---|---|
| 2004/0141420 | A1 | 7/2004 | Hardage et al. |
| 2008/0223129 | A1 | 9/2008 | Gysling et al. |
| 2008/0247273 | A1 | 10/2008 | Chemali et al. |
| 2009/0114013 | A1 | 5/2009 | DiFoggio |
| 2010/0025032 | A1 | 2/2010 | Smith et al. |
| 2010/0107754 | A1* | 5/2010 | Hartog .................. E21B 47/101 73/152.47 |
| 2010/0200744 | A1* | 8/2010 | Pearce ..................... G01V 8/16 250/268 |
| 2010/0207019 | A1 | 8/2010 | Hartog et al. |
| 2011/0030467 | A1 | 2/2011 | Bakulin |
| 2011/0088462 | A1* | 4/2011 | Samson .................. E21B 47/10 73/152.18 |
| 2011/0090496 | A1 | 4/2011 | Samson et al. |
| 2012/0014211 | A1 | 1/2012 | Maida et al. |
| 2012/0111104 | A1* | 5/2012 | Taverner ................ G01H 9/004 73/152.16 |
| 2012/0132417 | A1 | 5/2012 | Dria et al. |
| 2014/0202240 | A1* | 7/2014 | Skinner ................. E21B 47/101 73/152.32 |
| 2014/0216151 | A1* | 8/2014 | Godfrey et al. ........... 73/152.32 |

OTHER PUBLICATIONS

Bourns; "2027-xx-SM Precision Gas Discharge Tube Surge Protector", customer product information, dated Jul. 27, 2011, 3 pages.
Wikipedia; "Gas-filled tube", definition via http://en.wikipedia.org/Gas-filled_tube, dated Dec. 17, 2012, 9 pages.
JDSU; "Photovoltaic Power Converters", web page via http://www.jdsu.com, dated 2012, 1 page.
Pico Electronics; "Series A/SM Surface Mount and Plug-In", web page via http://www.picoelectronics.com, dated Jan. 8, 2013, 6 pages.
John Pasley; "Pulse Power Switching Devices", product overview via http://www.electronicstuff.co.uk, dated Sep. 24, 1996, 11 pages.
Mide; "Piezoelectric Sensor & Actuator: The QuickPack Advantage" product overview via http://www.mide.com, dated Jan. 8, 2013, 2 pages.
Robert McKee, et al.; "Acoustic in Pumping Systems", research tutorial, dated 2009, 6 pages.
International Search Report and Written Opinion dated Apr. 21, 2014 for PCT Patent Application No. PCT/US2014/010707, 16 pages.
International Search Report and Written Opinion dated May 2, 2014 for PCT Patent Application No. PCT/US2014/010696, 17 pages.
Society of Petroleum Engineers of Aime; "Case History of Large-Volume Fracture Stimulations in a West Texas Waterflood", SPE 11930, dated Oct. 5-8, 1983, 9 pages.
Halliburton; "HalSonics Firing Head", product overview via www.halliburton.com, dated 2013, 1 page.
International Search Report and Written Opinion dated Apr. 30, 2014 for PCT Application No. PCT/US2014/010862, 18 pages.
International Search Report and Written Opinion dated Jun. 24, 2014 for PCT Application No. PCT/US2014/010717, 15 pages.
Specification and Drawings for U.S. Appl. No. 13/778,617, filed Jan. 24, 2013, 43 pages.
Specification and Drawings for U.S. Appl. No. 13/748,720, filed Jan. 24, 2013, 30 pages.
Specification and Drawings for U.S. Appl. No. 13/748,764, filed Jan. 24, 2013, 46 pages.
Bakulin et al.; "Acoustic Surveillance of Production Impairment With Real-Time Completion Monitoring", SPE 112301, Feb. 13-15, 2008, 12 pages.
Bakulin et al.; "Real-Time Completion Monitoring with Acoustic Waves", Geophysics, vol. 73, No. 1, p. E15-E33, dated Jan.-Feb. 2008, 19 pages.
"International Application Serial No. PCT/US2014/010707, International Preliminary Report on Patentability dated Aug. 6, 2015", 11 pgs.
"European Application Serial No. 14743194.4, Office Action dated Sep. 1, 2015", 2 pgs.
"European Application Serial No. 14743194.4, Response filed Feb. 10, 2016 to Office Action dated Sep. 1, 2015", 10 pgs.

* cited by examiner

OPTICAL WELL LOGGING

BACKGROUND

This disclosure relates generally to equipment utilized and operations performed in conjunction with a subterranean well and, in an example described below, more particularly provides for well logging with an optical waveguide.

In conventional production logging operations, logging tools including, for example, a flowmeter, a collar locator, a gamma ray tool, pressure and temperature sensors, etc., are lowered into a well. The flowmeter typically includes a mechanical spinner which rotates in response to fluid flow across the spinner. The flowmeter can be positioned at various locations in the well, in order to determine a flow rate at each of those locations.

Such logging operations can take several hours to perform, and electrical and mechanical components of the logging tools are subject to failure in a hostile wellbore environment. Therefore, it will be appreciated that improvements are continually needed in the art of well logging. These improvements may be useful whether a well is utilized for production, injection or both.

DETAILED DESCRIPTION

Figure 1:
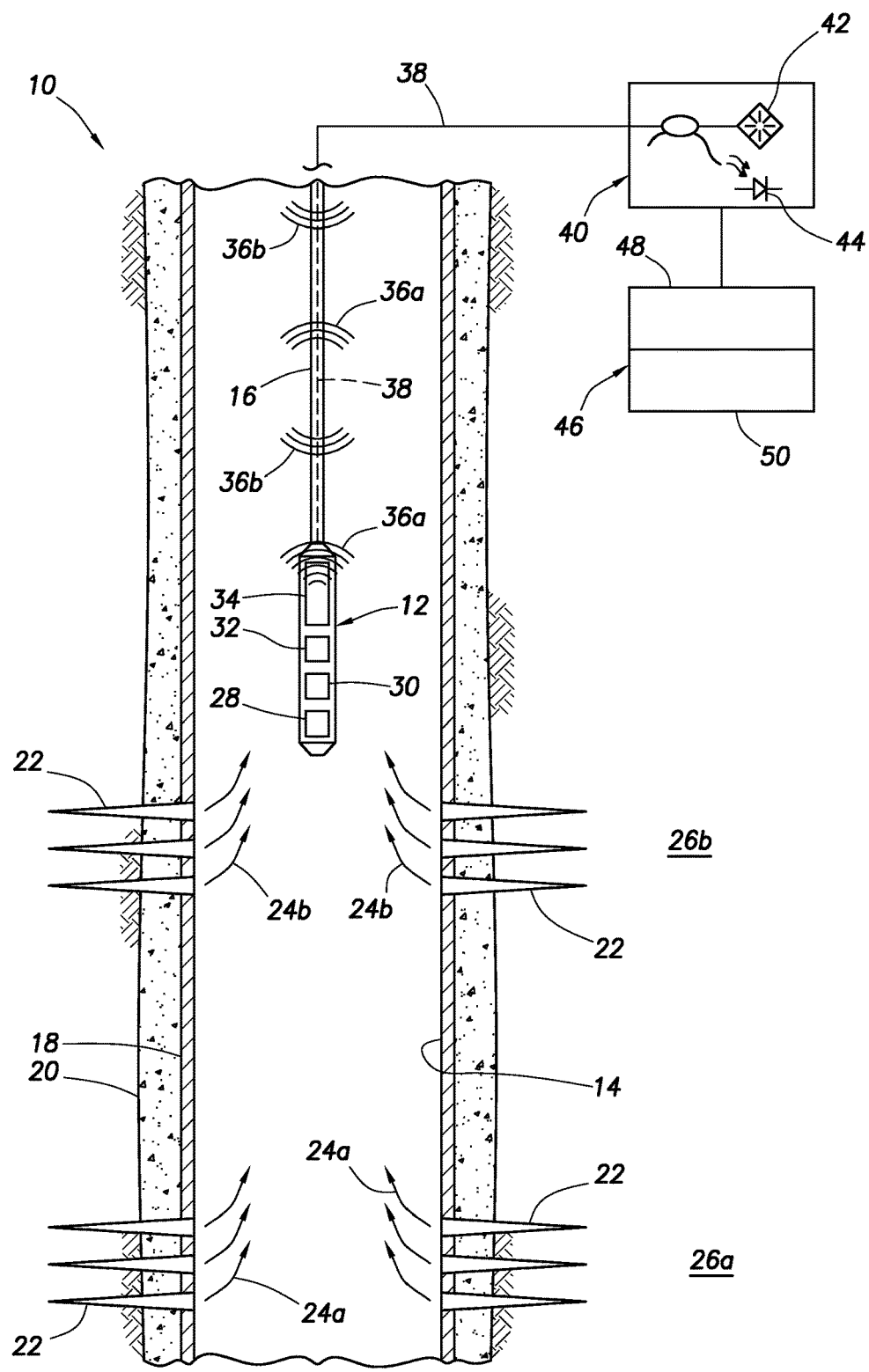
FIG. 1 is a representative partially cross-sectional view of a well logging system and associated method which can embody principles of this disclosure.

Representatively illustrated in FIG. 1 is a system 10 for use with a well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a well logging assembly 12 is conveyed into a wellbore 14 by a conveyance 16. The wellbore 14 is lined with casing 18 and cement 20. Perforations 22 formed through the casing 18 and cement 20 allow fluid 24a,b to flow into the wellbore 14 from respective formation zones 26a,b penetrated by the wellbore.

In this example, it is desired to determine a flow rate of each of the fluids 24a,b into the wellbore 14 from each of the zones 26a,b. However, in other examples it might be desired to determine a flow rate of injection fluid from the wellbore 14 into each of the zones 26a,b. Thus, the scope of this disclosure is not limited to any particular purpose for a well operation.

Instead, the principles described herein may be used for a variety of different purposes, whether or not the wellbore 14 is lined with casing 18 and cement 20, whether or not perforations 22 are used to flow fluids 24a,b between the wellbore and respective zones 26a,b, etc. These details and others are provided in the FIG. 1 example for purposes of illustration, but the scope of this disclosure is not limited to any of the FIG. 1 details.

The well logging assembly 12 may include conventional logging tools, such as, a casing collar locator 28, a gamma ray tool 30 and sensors 32 (for example, a pressure sensor and a temperature sensor). In addition, the well logging assembly 12 includes a signal generator 34 for generating one or more acoustic signals 36a in the well.

In some examples, the signals 36a could be generated by striking the conveyance 16, casing 18 or other structure. A mechanism could, for example, deliver a hammer impact driven by differential pressure, an electromagnetic solenoid, or other mechanical actuator.

In other examples, the signals 36a could be generated by detonating a series of explosive or other exothermic devices in the well. Thus, the scope of this disclosure is not limited to any particular manner of generating the signals 36a.

The signals 36a are preferably reflected in the well, for example, at a fluid/air or fluid/metal interface or any interface in the well with an abrupt change in acoustic impedance. Reflected signals 36b travel in the wellbore 14 in a direction opposite to that of the signals 36a generated by the signal generator 34.

For simplicity of illustration and explanation, FIG. 1 depicts the signals 36a travelling upwardly from the signal generator 34, and the reflected signals 36b travelling downwardly in the wellbore 14. However, in practice, the signals 36a would travel in both directions through the wellbore 14 from the signal generator 34, and the reflected signals 36b also travel in both directions, and can be reflected from any surface or other impedance change.

Acoustic signals 36a can be generated, for example, by impacting one component against another, by energizing one or more piezoelectric elements, etc. The scope of this disclosure is not limited to any particular way of generating the signals 36a.

As mentioned above, the conveyance 16 is used to convey the well logging assembly 12 into the well. However, the conveyance 16 also includes a component of the assembly 12, in the form of an optical waveguide 38 (such as, a single and/or multi-mode optical fiber or optical ribbon).

Although only one optical waveguide 38 is depicted in FIG. 1, any number of optical waveguides may be used, as desired. In addition, the conveyance 16 could include various other types of lines, such as, electrical conductors and fluid conduits. The scope of this disclosure is not limited to any particular number, combination, configuration or arrangement of lines in the conveyance 16.

The conveyance 16 may be in the form of a cable with suitable strength, temperature resistance, chemical resistance and protection for the optical waveguide 38. The cable could comprise stranded cable or cable made from small diameter (e.g., ¼ in. diameter) metal tubing or control line, with the optical waveguide 38 inside the line.

In some examples, the conveyance 16 could be in the form of a coiled tubing (e.g., a substantially continuous tubular string, typically stored on a reel), with the optical waveguide 38 positioned inside, in a wall of, and/or exterior to, the coiled tubing. The scope of this disclosure is not limited to any particular form of the conveyance 16, or to any particular position of the optical waveguide 38 with respect to the conveyance.

An optical interrogator 40 is coupled to the optical waveguide 38. The interrogator 40 includes a light source 42 (such as, an infrared laser) and an optical detector 44 (such as, a photodiode or other photo-detector).

The interrogator 40 is used to determine at least one parameter as distributed along the optical waveguide 38. This is accomplished by launching light from the source 42 into the optical waveguide 38 and detecting light backscattered in the optical waveguide.

In one technique known to those skilled in the art as distributed acoustic sensing (DAS), acoustic energy distributed along the optical waveguide 38 can be measured by detecting coherent Rayleigh backscattering in the waveguide. In this manner, the signals 36a and their reflections 36b can be effectively tracked as they travel along the waveguide 38 in the well.

In another technique, an array of weak fiber Bragg gratings or other artificially introduced reflectors can be used with the optical waveguide 38 to detect acoustic signals along the waveguide.

Velocities of the signals 36a and their reflections 36b can be readily determined using the DAS interrogator 40, for example, by dividing displacement of the signals by elapsed time. Using this information, with the system 10 configured as depicted in FIG. 1, an acoustic velocity in the commingled fluids 24a,b can be determined, as well as a velocity of the commingled fluids through the wellbore 14.

$$V_w = V_a + V_f \tag{1}$$

and:

$$V_o = V_a - V_f \tag{2}$$

where $V_w$ is the velocity of a signal traveling with the flow of fluid (in the FIG. 1 example, the generated signal 36a), $V_o$ is the velocity of a signal traveling opposite the flow of fluid (in the FIG. 1 example, the reflected signal 36b), $V_a$ is the acoustic velocity in the commingled fluids 24a,b, and $V_f$ is the velocity of the fluids through the wellbore 14. Solving the above linear equations yields:

$$V_a = (V_w + V_o)/2 \tag{3}$$

and, thus, the acoustic velocity $V_a$ is simply the average of the velocities of the generated signal 36a and the reflected signal 36b in the FIG. 1 example. In addition:

$$V_f = (V_w + V_o)/2 - V_o = V_w - (V_w + V_o)/2 \tag{4}$$

gives the velocity $V_f$ of the fluids 24a,b through the wellbore 14. Volumetric flow rate equals fluid velocity times cross-sectional area, so the flow rate of the fluids 24a,b can also be readily determined.

If Equation 4 yields a negative number for the velocity $V_f$, this is an indication that the fluid is flowing in an opposite direction to that assumed when applying values to the variables in Equations 1-4. The principles of this disclosure are applicable no matter whether a fluid flows with or in an opposite direction to a signal 36a generated by the signal generator 34, and no matter whether a fluid flows with or in an opposite direction to a reflected signal 36b.

The interrogator 40 can be connected to a control system 46 (including, for example, a processor 48, memory 50, software, etc.) for controlling operation of the interrogator, recording measurements, calculating acoustic velocities and fluid velocities, displaying results, etc.

Figure 2:
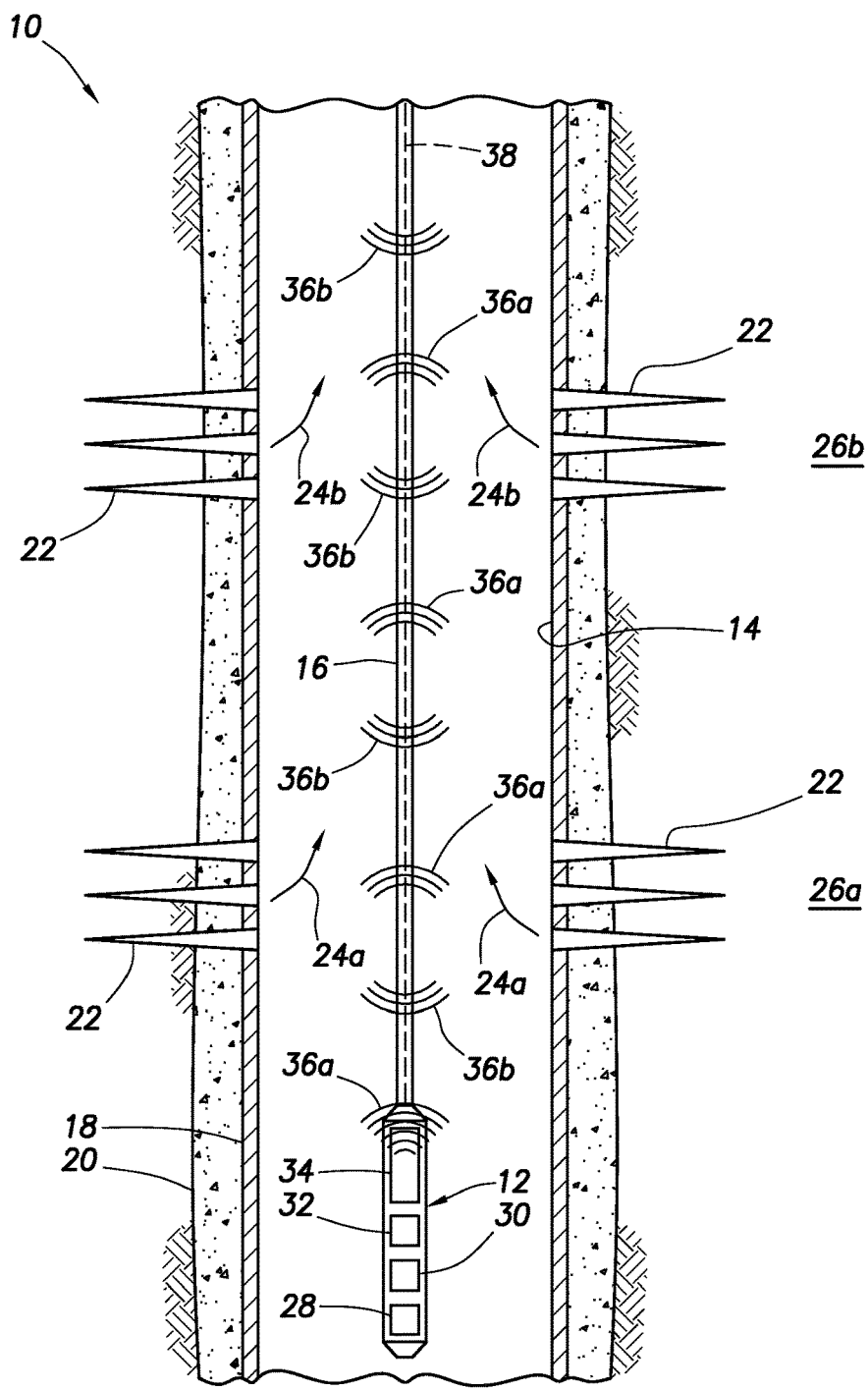
FIG. 2 is a representative partially cross-sectional view of the system and method, wherein a well logging assembly is displaced in a wellbore by a conveyance.

In the configuration depicted in FIG. 1, the system 10 can be used to determine the flow rate of the commingled fluids 24a,b, as well as characteristics (e.g., pressure, temperature, acoustic velocity, etc.) of the commingled fluids in the wellbore 14. However, by positioning the assembly 12 below the lower set of perforations 22, as depicted in FIG. 2, flow rates of each of the fluids 24a,b can be readily determined. This is so, because the system 10 is capable of detecting the velocities of the signals 36a and their reflections 36b as distributed along the optical waveguide 38 in the wellbore 14.

Thus, in a section of the wellbore 14 below the lower set of perforations 22 (where there is substantially no flow), the velocities of the signals 36a and their reflections 36b will be the same and, according to Equation (3) above, will equal the acoustic velocity $V_a$ in the fluid present in that section of the wellbore. In a section of the wellbore 14 between the lower and upper sets of perforations 22 (where only the fluid 24a flows), the velocity of the fluid 24a and the acoustic velocity in that fluid can be readily determined. In a section of the wellbore 14 above the upper set of perforations 22 (where the commingled fluids 24a,b flow), the velocity of the commingled fluids and the acoustic velocity in those fluids can be readily determined, as described above. Knowing the volumetric flow rate from the lower set of perforations 22, and the combined flow rate of the fluids 24a,b, one can readily determine a contribution to flow from the upper set of perforations via subtraction.

Therefore, it will be appreciated that, with the well logging assembly 12 positioned as depicted in FIG. 2, acoustic velocities and fluid velocities at each location in the wellbore 14 traversed by the optical waveguide 38 can be readily determined. This makes it unnecessary to relocate the assembly 12 to each position in which it is desired to determine a flow rate (e.g., as is the case with conventional flowmeters).

Instead, the assembly 12 can simply be positioned so that the optical waveguide 38 traverses all of the sections of the wellbore 14 of interest, the signal generator 34 can be operated to produce the signals 36a (and, consequently, their reflections 36b), and the interrogator 40 can quickly be used to measure acoustic energy along the optical waveguide. This consumes much less time as compared to conventional well logging techniques and, thus, is much more economical in practice.

The acoustic velocity $V_a$ in a fluid composition depends on the fluids in the composition and the compliance of the pipe walls or conduit walls containing the fluid. Because the pipe walls or conduit walls are not infinitely stiff, the speed of sound in the system is reduced in a quantifiable way. (see Robert McKee and Eugene "Buddy" Broerman, "Acoustics in Pumping Systems", $25^{th}$ International Pump User Symposium (2009)).

If one knows the acoustic velocity of the fluid composition and the pipe wall compliance(s) (readily calculated from pipe parameters such as the elasticity modulus of the steel pipe, the inside pipe diameter and the pipe wall thickness), the fluids in the composition (for example, an oil/water ratio) can be readily estimated.

In order to infer the composition of the fluid (oil, water, or the fractions of oil and water), the pipe compliance is very important. Pipe compliance can reduce the speed of sound in the pipe by as little as few percent all the way up to 50 percent or more.

Pipe compliance of a steel pipe is caused by not having infinitely stiff walls. It causes the acoustic wave traveling down the pipe to move slower than it would in a pipe with infinitely stiff walls.

There may be situations in which the reflected signals 36b are difficult to detect. For example, a suitable change in acoustic impedance may be located a substantial distance from the signal generator 34. In such situations, multiple signal generators 34a,b can be conveyed into the well, as depicted in FIG. 3.

Figure 3:
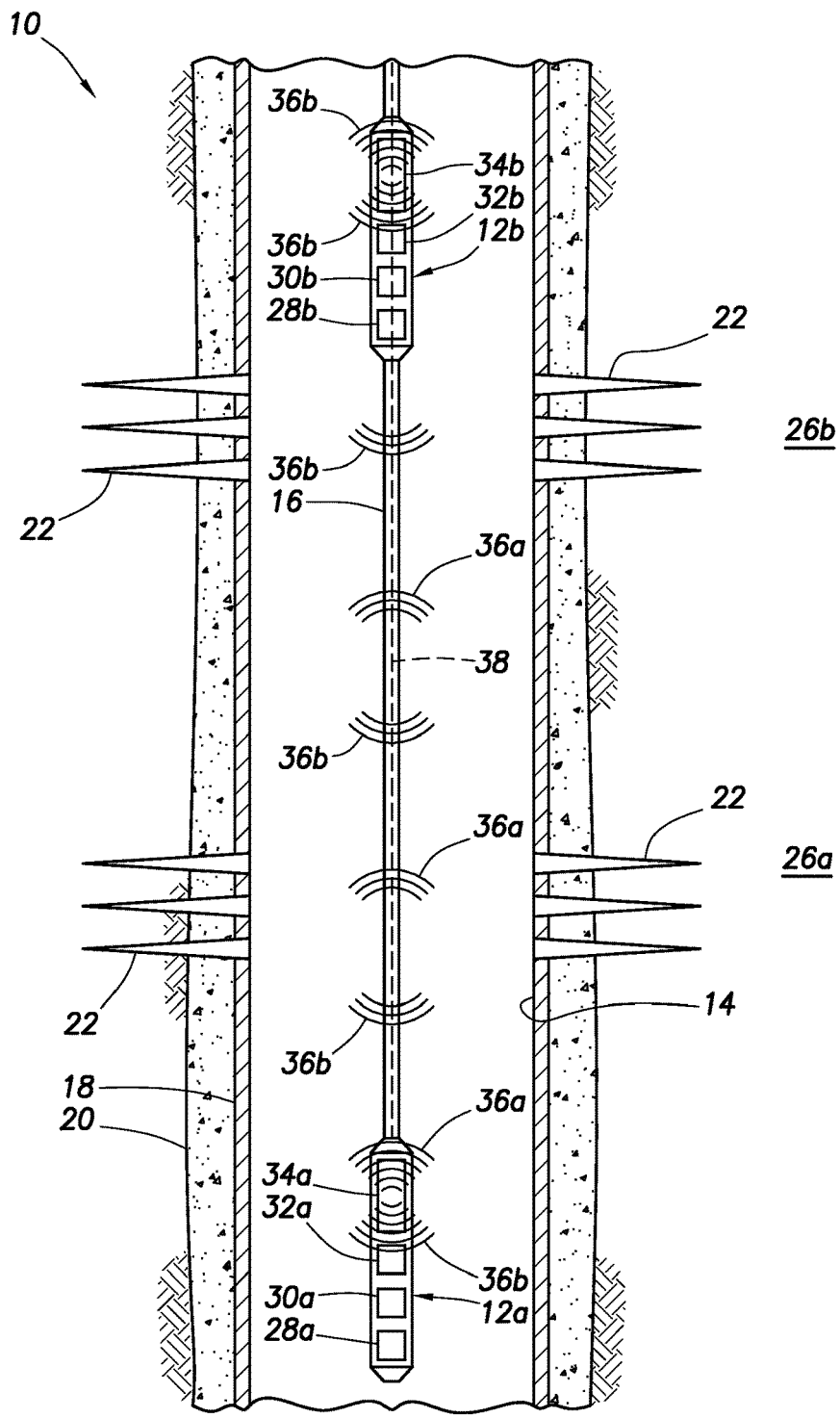
FIGS. 3-5 are representative partially cross-sectional views of additional examples of the system and method.

In the FIG. 3 example, the signals 36a are generated by a lower signal generator 34a, and the signals 36b are generated by an upper signal generator 34b (instead of being produced as reflections of the signals 34a). The signals 36a,b may be substantially the same, or they may be different types of signals.

The different types of signals may include acoustic signals with differing frequencies, differing amplitude envelopes and/or differing spectral content, etc. The use of different types of signals may aid in determining which generator 34a,b generated a particular signal observed at a particular location at a particular time. This additional information will aid an analysis of flow distribution along a section of wellbore.

Figure 4:
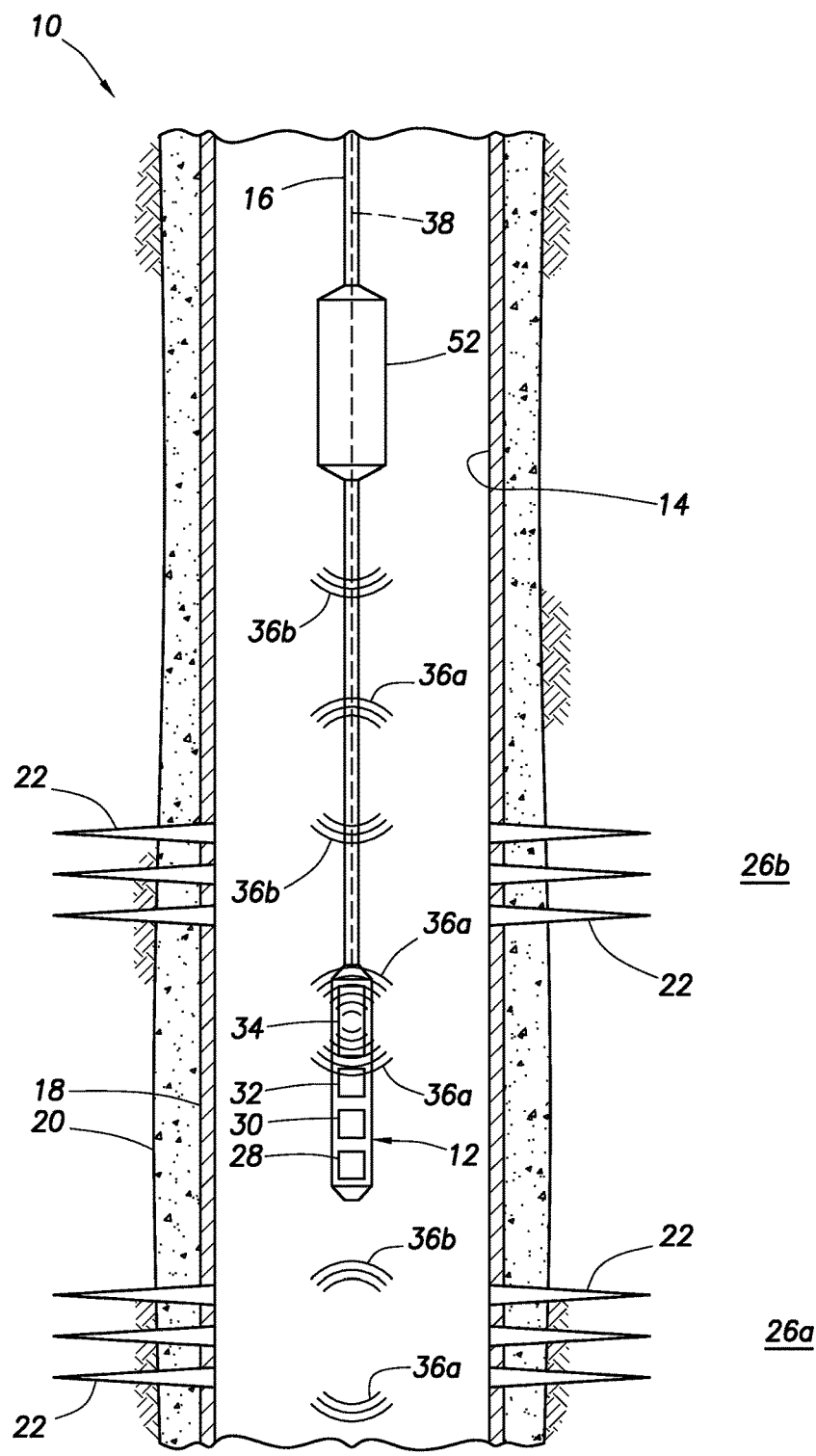

Referring additionally now to FIG. 4, another example of the system 10 and method is representatively illustrated. In this example, a reflector 52 is conveyed into the wellbore 14 with the conveyance 16, spaced apart from the signal generator 34.

The reflector 52 reflects the signals 36a back toward the signal generator 34. Any type of configuration suitable to cause an acoustic impedance change in the wellbore 14 may be used for the reflector 52.

FIG. 4 also depicts that the signals 36a can be reflected from acoustic impedance changes below the signal generator 34. For example, the signals 36a may be reflected by a bottom of the wellbore 14, by a plug set in the wellbore, by a change in casing 18 diameter (whether an increase or decrease), etc. Thus, the scope of this disclosure is not limited to any particular way of producing the reflected signals 36b and, as demonstrated by the example of FIG. 3, it is not necessary for reflected signals to be detected by the system 10 at all.

Figure 5:
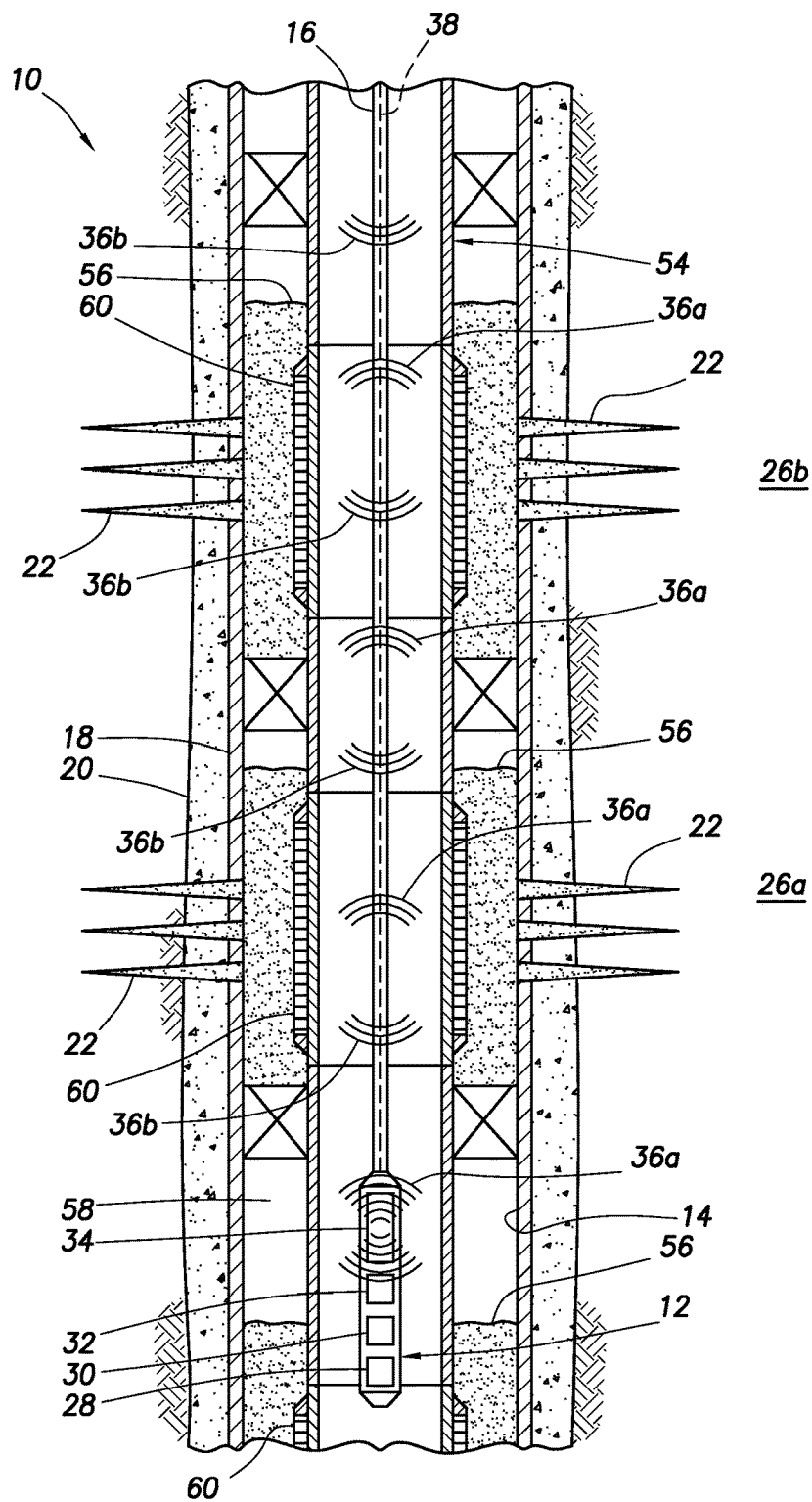

Referring additionally now to FIG. 5, yet another example of the system 10 and method is representatively illustrated. In this example, a tubular string 54 is installed in the casing 18, and gravel 56 is packed in sections of an annulus 58 formed radially between the tubular string and the casing.

It is beneficial to be able to determine whether the gravel 56 has been suitably packed in the various sections of the annulus 58, so that voids are not present in the annulus surrounding well screens 60 connected in the tubular string 54. If voids are present, then appropriate remedial measures can be taken, e.g., to prevent damage to the well screens 60, prevent production of sand and fines, etc. If voids are not present, such remedial measures can be dispensed with.

Fortunately, the same system 10 that is used to determine flow rates along the wellbore 14 can also (or alternatively) be used to infer a density of each of the gravel 56 packings about the tubular string 54. Those skilled in the art refer to a "hydraulic impedance testing" of a gravel pack, meaning testing of the hydraulic connectivity between a formation zone and a tubular string via a gravel pack.

The hydraulic impedance of a gravel pack is very closely related to the density and permeability of the gravel pack. Hydraulic impedance testing can be used to determine which sections of a gravel pack are plugged (flow restricted).

In general, the greater the density of the gravel pack, the lower its permeability, and the greater its hydraulic impedance. In the system 10, the signals 36a can be transmitted from the signal generator 34 into each of the packs of gravel 56, and reflections detected along the optical waveguide 38. Such reflections will provide indications of the various gravel packs' density, permeability and hydraulic impedance.

It may now be fully appreciated that significant advancements are provided to the art by the above disclosure. The well logging system 10 and method described above allow well logging operations to be completed in substantially less time, and at less expense, as compared to conventional production, injection and/or hydraulic impedance logging operations.

A method of logging a well is provided to the art by the above disclosure. In one example, the method can comprise: conveying an optical waveguide 38 and at least one signal generator 34 with a conveyance 16 into the well; causing the signal generator 34 to generate at least one signal 36a in the well; and receiving the signal 36a as distributed along the optical waveguide 38.

The signal 36a may comprise an acoustic signal, and/or a pressure pulse.

The step of receiving the signal 36a can include detecting light backscattered in the optical waveguide 38. Receiving the signal 36a can include detecting light reflected via the optical waveguide 38 (e.g., from fiber Bragg gratings or other reflectors).

The method may also include receiving a reflection 36b of the signal 36a as distributed along the optical waveguide 38.

The conveying step may include conveying at least first and second ones of the signal generators 34a,b. The first and second signal generators 34a,b may be caused to generate at least first and second respective ones of the signals 36a,b. The receiving step can include receiving the first and second signals 36a,b as distributed along the optical waveguide 38.

The signal 36a may be transmitted through a gravel 56 packed section of the well. The method can include determining a hydraulic impedance of the gravel 56 packed section based on the receiving.

The method can include determining a fluid acoustic velocity $V_a$ based on the receiving. The method can include determining a velocity $V_f$ of a fluid in the well based on the receiving. The determining step can include compensating for pipe compliance.

The conveyance 16 may comprise a cable with the optical waveguide 38 incorporated therein. The conveyance 16 may comprise a coiled tubing. However, the scope of this disclosure is not limited to use of any particular type of conveyance.

The causing step can include striking a structure (such as the conveyance 16 or the casing 18, etc.) which transmits the signal 36a. The causing step can include activating an exothermic device (such as, an explosive device or a chemical charge, etc.).

A well logging system 10 is also described above. In one example, the system 10 can include a conveyance 16 with an optical waveguide 38, and at least one signal generator 34 which is conveyed by the conveyance 16 into a well with the optical waveguide 38. The signal generator 34 generates at least one signal 36a received with the optical waveguide 38.

The system 10 can also include an optical interrogator 40 which detects light backscattered in the optical waveguide 38.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of logging a well, the method comprising:
    conveying a well logging assembly and an optical waveguide into the well with a conveyance, the well logging assembly comprising at least one signal generator;
    generating a signal in the well with the signal generator;
    receiving the signal distributed along the optical waveguide; and
    determining flow rates of fluids flowing into or from formation zones along the well using the received signal, wherein determining the flow rates comprises determining a velocity of each fluid along the well by detecting velocities of the generated signal and a reflection of the generated signal based on the received signal, and compensating for pipe compliance.

2. The method of claim 1, wherein the signal comprises an acoustic signal.

3. The method of claim 1, wherein the signal comprises a pressure pulse.

4. The method of claim 1, wherein receiving the signal comprises detecting light backscattered in the optical waveguide.

5. The method of claim 1, wherein receiving the signal comprises detecting light reflected via the optical waveguide.

6. The method of claim 1, further comprising receiving a reflection of the signal as distributed along the optical waveguide.

7. The method of claim 1, wherein conveying further comprises conveying more than one signal generator, wherein generating a signal further comprises generating a signal in the well with each signal generator, and wherein receiving the signal further comprises receiving the signals distributed along the optical waveguide.

8. The method of claim 1, wherein the generating the signal further comprises transmitting the signal through a gravel packed section of the well.

9. The method of claim 8, further comprising determining a hydraulic impedance of the gravel packed section based on the receiving.

10. The method of claim 1, wherein generating the signal comprises any one or combination of striking the conveyance or casing with a hammer impact, detonating a series of explosive devices in the well, detonating a series of exothermic devices other than explosive devices in the well, impacting one component against another component of a logging system in the well, or energizing one or more piezoelectric elements in the well.

11. The method of claim 1, wherein generating further comprises activating an exothermic device.

12. The method of claim 1, wherein generating the signal further comprises striking a structure which transmits the signal.

13. The method of claim 1, wherein the conveyance comprises a cable with the optical waveguide incorporated therein.

14. The method of claim 1, wherein the conveyance comprises a coiled tubing.

15. The method of claim 1, wherein the conveying further comprises conveying a reflector with the conveyance into the well.

16. A well logging system for logging a well, comprising:
    a conveyance comprising an optical waveguide;
    a well logging assembly coupled to the conveyance and comprising a signal generator, the signal generator being conveyable by the conveyance into the well and operable to generate a signal receivable by the optical waveguide;
    an optical interrogator in communication with the optical waveguide so as to be able to receive the signal distributed along the optical waveguide; and
    a control system connected to the optical interrogator and configured to:
        determine velocities of fluids flowing into or from formation zones along the well by detecting velocities of the generated signal and a reflection of the generated signal based on the received signal, and compensating for pipe compliance; and
        determine flow rates of fluids flowing along the well using the determined velocities of the fluids.

17. The system of claim 16, wherein the signal generator comprises a hammer impact mechanism to strike the conveyance or casing, a series of explosive devices operably actuated in the well by a detonator, a series of exothermic devices other than explosive devices operably actuated in the well by a detonator, components operable to impact against each other component, or one or more piezoelectric elements operably energized in the well.

18. The system of claim 16, wherein the received signal is indicative of a velocity of a fluid in the well.

19. The system of claim 16, wherein the received signal is indicative of a fluid acoustic velocity in the well.

20. The system of claim 16, wherein the conveyance comprises a cable with the optical waveguide incorporated therein.

21. The system of claim 16, wherein the conveyance comprises a coiled tubing.

22. The system of claim 16, wherein the signal comprises an acoustic signal.

23. The system of claim 16, wherein the signal comprises a pressure pulse.

24. The system of claim 16, wherein a reflection of the signal is receivable with the optical waveguide.

25. The system of claim 16, wherein the well logging system includes a second signal generator coupled to the conveyance, wherein the second signal generator is operable to generate a second signal receivable by the optical waveguide.

26. The system of claim 16, wherein the generated signal is transmittable through a gravel packed section of the well.

27. The system of claim 26, wherein the received signal is indicative of a hydraulic impedance of the gravel packed section.

* * * * *